Patented Jan. 16, 1945

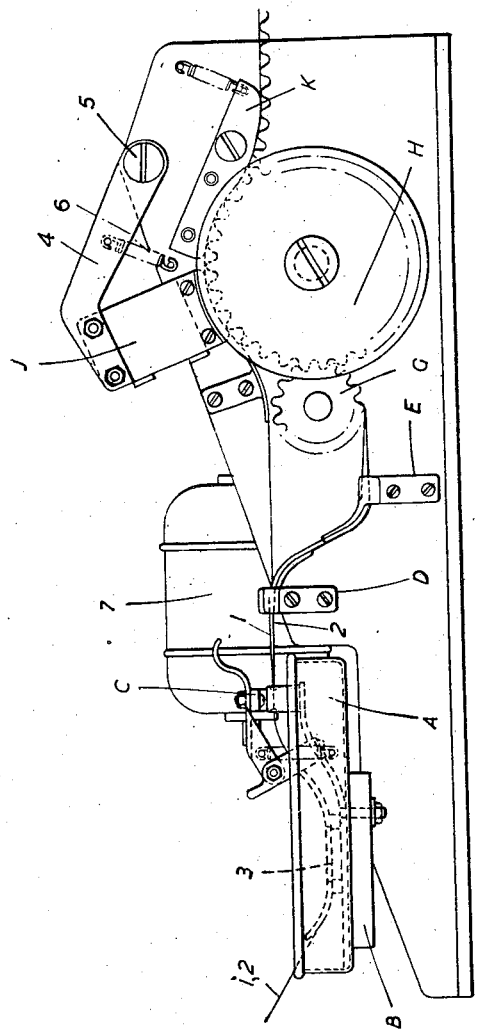

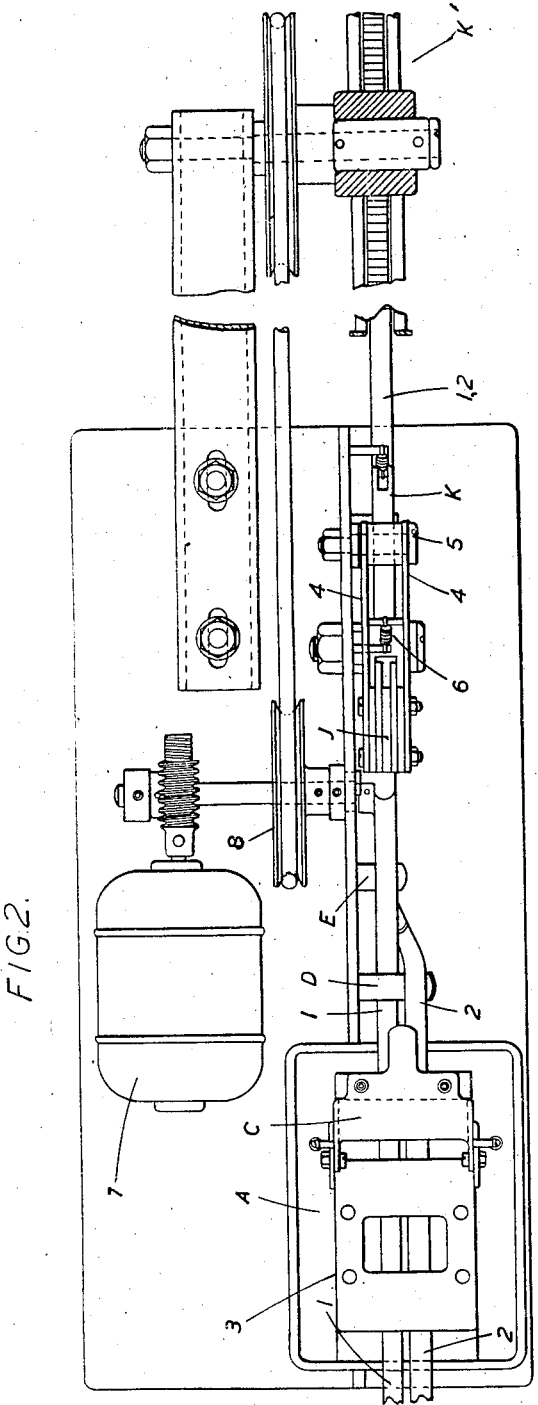

2,367,274

UNITED STATES PATENT OFFICE 2,367,274

MACHINE FOR MANUFACTURING SOLDERED PARTS

John Handley, Ferndown, Northwood Hills, Northwood, Middlesex, England, assignor to Standard Telephones and Cables Limited, London, England, a company of Great Britain Application November 20, 1943, Serial No. 511,101
In Great Britain October 23, 1942

3 Claims. (Cl. 113—1)

This invention relates to machines for manufacturing soldered parts.

It frequently happens that parts of a manufactured article are to be joined together by a soldering operation and hitherto so far as I am aware the soldering of the parts together has been performed as an operation entirely separate from the manufacture of the parts.

It is the object of the present invention to enable the manufacture of an article which comprises parts joined together by soldering to be carried out as a continuous operation.

According to the present invention I provide a power driven machine for manufacturing an article, such as an element of an air filter, from two or more parts joined together, comprising means for shaping at least one of said parts, a bath of solder, means for passing said parts through said bath and means for guiding the parts into the relative positions they are to occupy and for traversing them when in such positions, in contact with a heating element to solder them together.

The nature of the invention will be better understood from the following description of one embodiment thereof taken in conjunction with the accompanying drawings.

Figs. 1 and 2 of the drawings show in elevation and plan respectively a machine for crimping a metal tape and soldering it to a flat taps to form an element of an air filter. Two metal tapes (1, 2) enter side by side first through a bath containing flux (not shown) and then into a thinning bath A, heated by an electric heating element B located under the bath. The tapes are led under a guide 3 and immediately they emerge from the bath they pass through a wiper C which removes surplus solder. One tape 2 passes guides D by which it is guided under the position occupied by the other tape 1. Tape 2 passes through a guide E and then between a small gear wheel G and a large gear wheel H by which it is crimped and then joins the other tape. Both tapes together pass under a low voltage heating element J which is mounted on a lever 4 pivoted at 5 and held against the teeth of the larger gear wheel H by a spring 6. This causes the tinned tapes to be soldered together and the soldered tapes pass under a guide K through which cooling water is circulated, guide K being also held against the large gear wheel H.

The gear wheels G, H are driven by a motor 7, which also drives by means of a pulley 8 and belt 9 a pulling mechanism K' by means of which the tapes 1, 2 are drawn through the machine.

What is claimed is:

1. A power driven machine for manufacturing soldered parts, comprising a bath of solder through which said parts pass individually in spaced relation, guide means operatively related to said bath for bringing said parts into substantial register with one another, means beyond said guide means and operatively related thereto for shaping at least one of said parts and advancing said shaped part or parts into contact with its companion part or parts, heating means and cooling means operatively related to said shaping and advancing means for soldering said contacting parts together while retained by the shaping means.

2. A power driven machine for manufacturing soldered parts, comprising a bath of solder through which said parts pass side by side, guide means operatively related to said bath for bringing said parts into superimposed registered relationship, means for shaping at least one of said parts, means interposed between said guide means and said shaping means for guiding at least one of said parts separately from other of said parts to said shaping means, said shaping means being adapted to advance said parts in re-superimposed registered relationship, heating means and cooling means operatively related to said shaping and advancing means for soldering said re-superimposed parts together while retained by said shaping means.

3. A power driven machine for manufacturing soldered parts comprising a bath of solder through which said parts pass individually in spaced relation, guide means operatively related to said bath for bringing said parts into substantial register with one another, cooperating roller means beyond said guide means and operatively related thereto for shaping at least one of said parts and advancing said shaped part or parts into contact with its companion part or parts, heating means and a cooling member beyond the heating means, said heating means and cooling member being operatively related to the shaping rollers to effect the soldering and cooling of the parts while retained by at least one of the shaping rollers.

JOHN HANDLEY.

CERTIFICATE OF CORRECTION.

Patent No. 2,367,274.  January 16, 1945.

JOHN HANDLEY.

It is hereby certified that error appears in the printed specification of the above numbered patent requiring correction as follows: Page 1, first column, line 33-34, for the word "thinning" read --tinning--; and that the said Letters Patent should be read with this correction therein that the same may conform to the record of the case in the Patent Office.

Signed and sealed this 5th day of June, A. D. 1945.

(Seal)

Leslie Frazer
Acting Commissioner of Patents.